June 2, 1970  A. WEHNER  3,515,274
FLOOR SCREENS

Filed July 26, 1967  6 Sheets-Sheet 1

INVENTOR
Albert Wehner

June 2, 1970   A. WEHNER   3,515,274
FLOOR SCREENS

Filed July 26, 1967   6 Sheets-Sheet 3

INVENTOR

June 2, 1970    A. WEHNER    3,515,274
FLOOR SCREENS
Filed July 26, 1967    6 Sheets-Sheet 6

INVENTOR

United States Patent Office 3,515,274
Patented June 2, 1970

3,515,274
FLOOR SCREENS
Albert Wehner, Wieladingen Post Schweikhof,
Haus 35, Germany
Filed July 26, 1967, Ser. No. 656,095
Claims priority, application Germany, July 27, 1966,
W 42,097
Int. Cl. B07b 1/16, 1/52
U.S. Cl. 209—322                                15 Claims

ABSTRACT OF THE DISCLOSURE

A screening device has two frames, one above the other, which oscillate relative to each other, the upper frame carrying a screen mesh with elongated and parallel slots, whereas the lower frame supports mutually spaced cleaning fingers protruding upwardly toward respective slots. The oscillatory motion is substantially circular in upright planes parallel to the longitudinal direction of the slots. The fingers brush past the ends of the slots and during part of the cycle extend upwardly through the slots to above the screen mesh.

---

Figure 1:
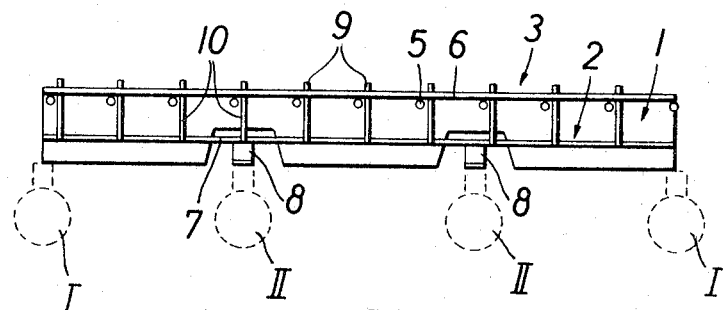

The invention relates to floor screens having two frames which oscillate relatively to each other, one of the frame supporting the screen proper, which has elongated slots, and the other lower frame supporting cleaning fingers spaced apart by the spacing of crossbars of the screen proper and penetrating vertically upwards through the screen slots.

Up till now, the two oscillating frames have been driven in such a way that the cleaning fingers travel back and forth in the plane of the screen. Consequently the cleaning fingers, which are mounted on the lower oscillating frame, are not effective above the screening surface. Furthermore the cleaning fingers do not remove the particles of material which have accumulated on the crossbars of the screen proper, On the contrary, the cleaning fingers merely squash together or compact this material. Floor screens of this kind are therefore unsatisfactory when it comes to screening difficult material, particularly sticky material.

In accordance with this invention, these disadvantages are overcome in a floor screen with two frames which oscillate relatively to each other, one frame supporting a screen which has elongated slots and the other frame supporting cleaning fingers which are distributed at the spacing of the slots and project upwards into the slots, the two oscillating frames being arranged to be given substantially circular movements relatively to one another in upright planes parallel to the elongation of the slots such that the cleaning fingers brush past the ends of the slots and project at least during part of the cycle above the screen.

The relative oscillations of the two frames bring the cleaning fingers close to the walls of the slots, at intervals during the cycle of movements, and produce a brushing effect. In this way the mechanism is remarkably self-cleaning. A further important advantage of the new floor screen is that, due to the fact that the cleaning fingers project at least partly to above the cleaning surface, the material being screened can if desired at the same time be intensively accelerated in one direction so that the material being screened will be moved from one end of the screen to the other. Moreover the formation of cleaning fingers itself acts as a slotted screen or comb, during the upper part of the movement, producing a preliminary screening effect, so that in this way the material is already screened, or classified, before being subjected to the action of the screen proper. These advantages are practically independent of the nature of the screen plate which forms the screening surface proper. Although wire screens, flexible or not, are particularly suitable for use with the floor screen according to the invention, perforated screen plates or pressed, welded or woven screens, can be used if desired.

The cleaning fingers are preferably in the form of upwardly projecting comb teeth formed on comb beams which extend across and beneath the slots of the screen and which are mounted on longitudinal beams themselves mounted on transverse beams, these parts together forming the lower oscillating frame which is mounted on driving members, the oscillating frame which supports the screen being mounted on another driving member.

For the sake of convenience the two oscillating frames may be joined together by flexible joints to form an easily assembled structural unit. This arrangement not only simplifies assembly but also allows a number of assembled structural units of this kind to be joined together to form a floor screen of any desired size.

In order to facilitate the upward movement of the cleaning fingers, or comb teeth, and their penetration into the material being screened, and if necessary to facilitate their penetration into the screen slots, the upper ends of the comb teeth may be rounded or pointed. For the same purpose the crossbars and longitudinal wires forming the screen slots preferably have essentially trapezoidal cross-sections, becoming narrower towards the bottom.

In order to produce differential screening effects over the surface of the screen, the comb teeth can have different lengths, so that they penetrate to different depths into the material being screened.

In many applications it is an advantage to use comb teeth whose upper ends are curved or angled in the plane of the screen slot. Moreover the upper part of each comb tooth, that is to say the part which projects above the screen surface, can, if desired, have sharpened or saw tooth front and rear edges, to give a cutting or tearing action by co-operation with the screen. This is an advantage, for example when the material being screened contains wood chips or the like. Very good screening and cleaning effects can be obtained by using comb teeth in the form of wire loops through which there are inserted, above the screening surface, transverse bars which rest loosely on the longitudinal wires of the screen.

Figure 2:
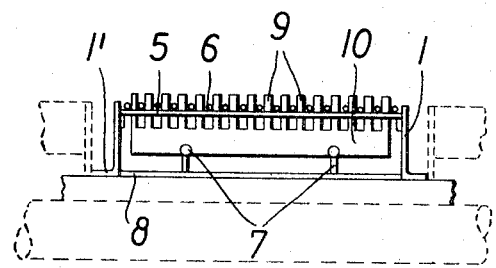
Figure 3:
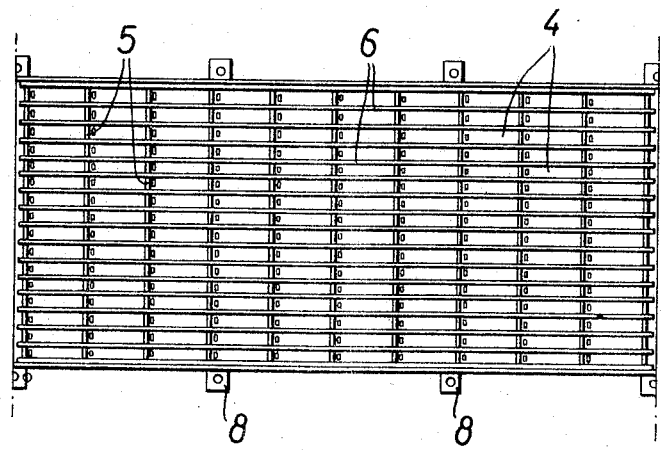
Figure 4:
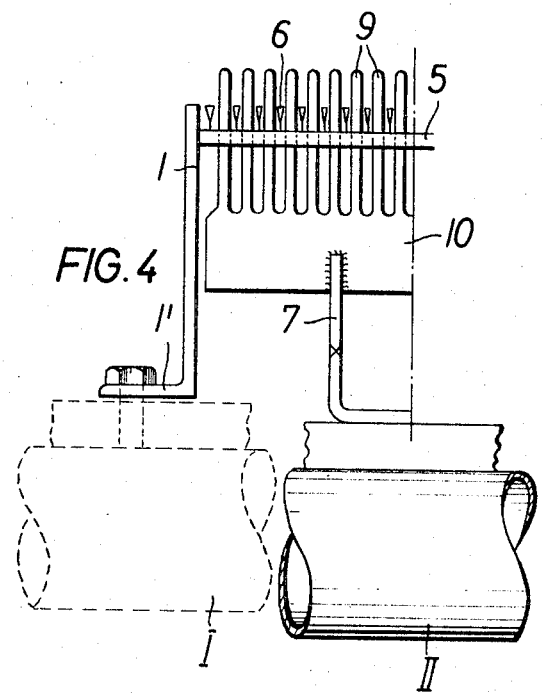
Figure 19:
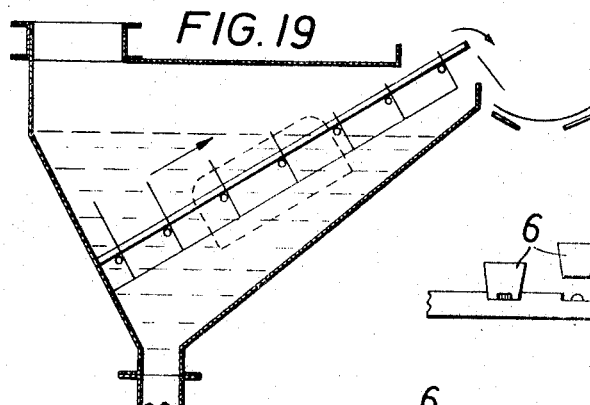
Figure 20:
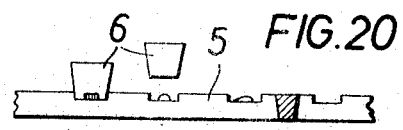
Figure 21:
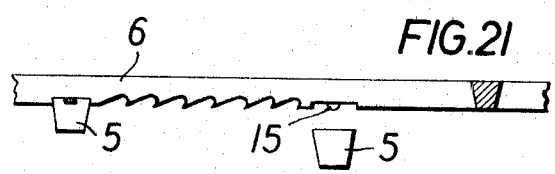
Figure 22:
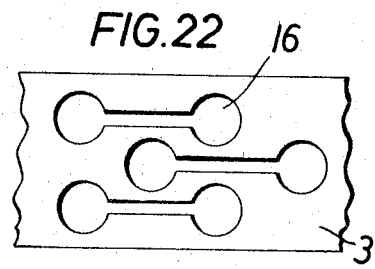
Figure 23:
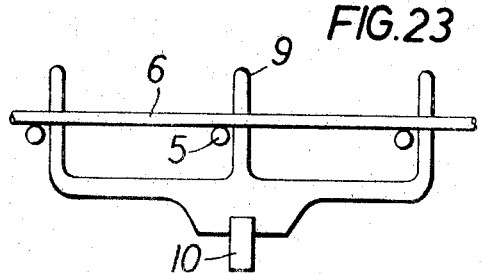

One example of a floor screen according to the invention and several modifications of various parts are illustrated in the accompanying drawings, in which:

FIG. 1 is a side elevation of the floor screen.
FIG. 2 is an end elevation of the floor screen.
FIG. 3 is a plan of the floor screen.
FIG. 4 is an end elevation of a part of the floor screen.
FIGS. 5 to 18 show various different types and arrangements of comb beams and cleaning fingers;
FIG. 19 shows the floor screen mounted as an inclined conveyor in a wet processing vessel;
FIGS. 20 to 22 show various modifications of the screen through which the cleaning fingers pass;
FIG. 23 shows an alternative method of mounting the cleaning fingers; and,
FIGS. 24 to 28 represent a part of the floor screen during four different phases of the oscillatory cycle.

The floor screen shown in FIGS. 1 to 3 consists essentially of two oscillating frames 1 and 2 driven by two driving members I and II of a screen machine, so that the frames 1 and 2 oscillate relatively to each other. The oscillating frame 1 supports the screen proper 3 which in this case is a slotted screen of which the slots 4 are formed by crossbars 5 and longitudinal wires 6. The bars and wires are joined together. The oscillating frame 1, which supports the screen 3, is itself supported by cheek plates whose angled feet 1' are attached to the driving members I of the screening machine, which is not itself shown in the drawing. The oscillating frame 2 consists in this version of transverse beams 8 mounted on the driving members II, and, mounted on the transverse beams 8, longitudinal beams 7, carrying an array of cleaning fingers 9 which project vertically upwards through the slots 4 in the screen proper 3. These cleaning fingers 9 are in the form of the teeth of comb beams 10 which are mounted parallel to each other spaced apart by the spacing of the slots 4. The comb beams 10 are mounted upright on the longitudinal beams 7 of the lower oscillating frame 2. In the version shown, the comb beams 10 extend transversely parallel to the crossbars 5, which form the end walls of the slots 4 of the screen proper 3. The comb beams 10 are so mounted that, during oscillation of the two frames 1 and 2, the cleaning fingers 9 rise far enough to project upwards, at least part of the time, through the slots 4 to positions above the surface of the screen proper 3.

The driving members I and II of the screening machine perform circular oscillating movements at 180° with respect to each other, and the cleaning fingers 9 perform corresponding circular movements relative to the slots 4, through which they penetrate. As a result of this circular movement each cleaning finger not only sweeps the entire length and breadth of its slot, but at the same time performs an up and down movement relative to the slot. This combination of movements produces a pronounced self-cleaning effect and not only are the crossbars 5 and longitudinal wires 6 forming the slots 4 of the screen 3 swept clear of deposited particles of the material being screened, but the cleaning fingers themselves are swept clear of particles by these movements. Furthermore the cleaning fingers rise, at least during part of the cycle, above the surface of the screen 3, and, in this way, loosen the material being screened and help to convey it forwards.

If the floor screen is mounted inclined, the direction of oscillation of the comb teeth 9 can if desired be such as to tend to move the material uphill, so that the material being screened is subjected to an intensive agitation. Furthermore the material being screened can if desired actually be conveyed upwards by the comb teeth. For example a sediment such as a mineral ore, coal fines or the like can be removed with great advantage in this way from wet process vessels, as indicated in FIG. 19.

The two oscillating frames 1 and 2 which support the screen plate 3 and the comb beams 10 are attached together by flexible joints, not shown in the drawing, to form an easily assembled structural unit. These structural units are joined to the driving members I and II of the screen machine by means of attachment elements so arranged that the individual floor screens can be mounted in series one after the other, or next to each other, to form screening surfaces and screening structures of any desired size, as will be seen from FIGS. 1 to 3.

FIG. 4 is a partly sectional view drawn to an enlarged scale of the floor screen, showing in greater detail the method of co-operation between the comb beams 10 with their comb teeth 9, on the one hand, and the crossbars 5 and longitudinal wires 6 of the screen 3, on the other hand. The comb teeth 9 have rounded upper ends, and the longitudinal wires 6 are of wedge-shaped cross-section, wider at the top. This arrangement facilitates the upward movement of the comb teeth 9 between the longitudinal wires 6, and facilitates the penetration of the comb teeth 9, during the upward movement of the comb beams 10, into the material being screened on the screen 3. The fact that the comb teeth 9 engage closely in the screen slots 4 ensures that the crossbars 5, the longitudinal wires 6 and also the comb teeth 9 themselves are properly brushed free of adhering particles of material by the oscillating movements of the floor screen. The comb system consisting of the longitudinal beams 7, the teeth 9 and the comb beams 10, is mounted on the driving members II, and the screen itself, consisting of the crossbars 5 and the longitudinal wires 6, is attached to the oscillating frame 1, which is mounted on the driving member I. The two driving supports I and II oscillate at 180° with respect to each other about their longitudinal axes.

Figure 5:
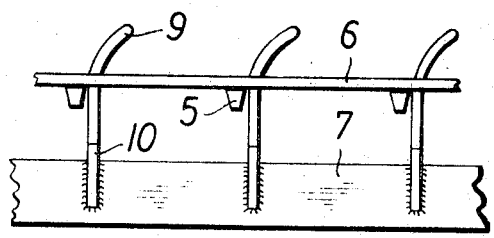
Figure 6:
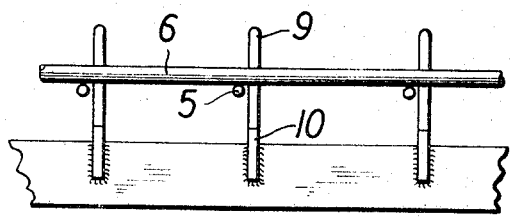

FIG. 5 shows a detail of the floor screen assembly. The crossbars 5 supporting the longitudinal wires 6 have trapezoidal-shaped cross-sections, wider towards the top, so that their upper edges function as scraper knives. The comb teeth 9 are slightly bent over forwards in order to provide an upwards conveying action if the screen is mounted at a slope. FIG. 6 shows a different version in which the crossbars 5 are of circular cross-section. In this case the comb teeth 9 mounted on the comb beams 10 are straight.

Figure 7:
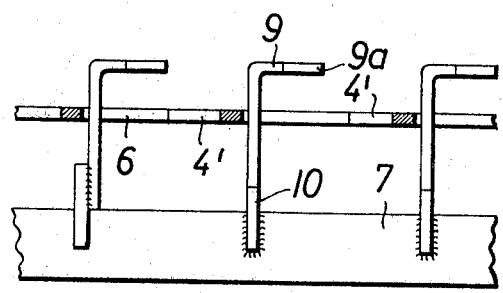

In the version of FIG. 7, the slots 4 in the screen are wider at 4', and the comb teeth 9 are correspondingly wider at 9a. With this arrangement it is possible in special cases to lift and move discs of the material through the main body of the material, after the manner of a tablet-forming process.

Figure 8:
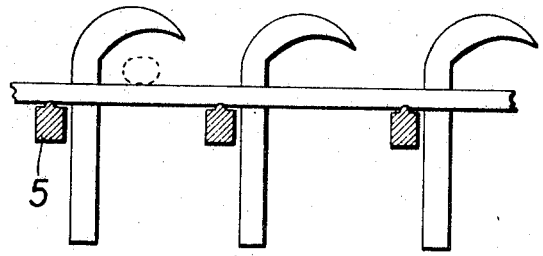

In FIG. 8 the longitudnal wires 6 are spot welded by a special welding bead to the crossbars 5. In this case the comb teeth 9 have cutting edges. This floor screen can therefore be used not only for screening and conveying material but also for reducing its particle size. The comb teeth can have other shapes to effect the size reduction.

Figure 9:
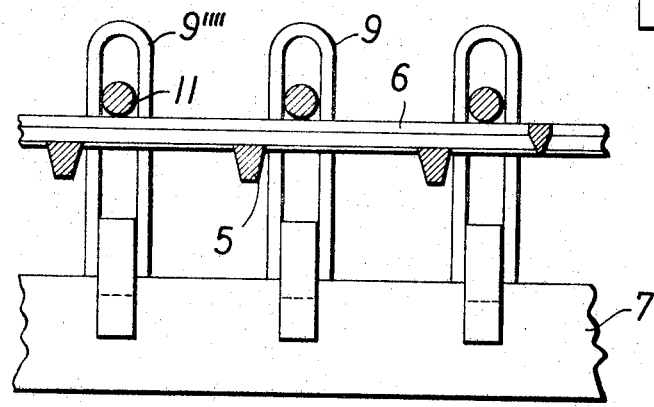

In FIG. 9 the comb teeth 9'''' are loops containing loosely inserted transverse bars 11. During the screening movement the transverse bars help to clean the upper edges of the longitudinal wires 6 by a rolling action. The transverse bars 11 can if desired be mounted movably underneath the screen surface. On the other hand, as an alternative to the arrangement shown in FIG. 9, the loop-shaped comb teeth 9'''' can if desired extend parallel to the directions of the crossbars 5. It is furthermore possible to use transverse bars 11, of different cross-sectional shapes, mounted loosely between the rows of comb teeth. This arrangement has the advantage that the longitudinal wires 6 are cleaned where they pass above the crossbars 5.

Figure 10:
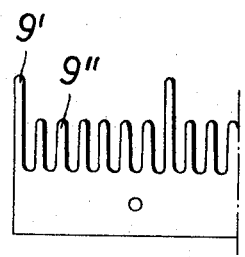

FIG. 10 shows a comb beam 10 equipped with comb teeth of different lengths. The long teeth 9' can if desired be long enough to project through the screen slots during the entire oscillating cycle, so that they function as guides, the shorter comb teeth 9'' appearing above the surface of the screen, that is to say above the longitudinal wires 6, only during a part of the cycle.

Figure 11:
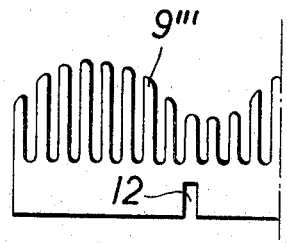

In FIG. 11 the upper ends of the comb teeth 9''' form a curve which has the effect of loosening up the material sideways. The open slot 12 serves for mounting the comb beam 10 on the longitudinal beam 7.

Figure 12:
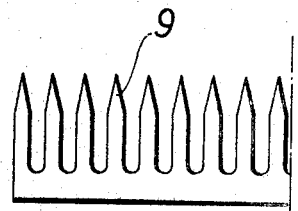
Figure 13:
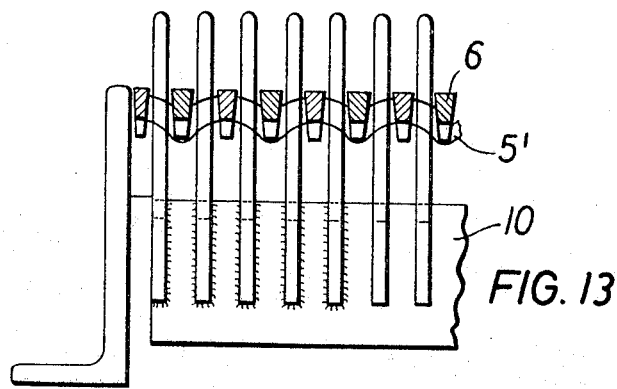

In FIG. 12 the comb teeth 9 have pointed ends, to facilitate the entry of each comb tooth into the screen slot, and also to facilitate its outward movement from the slot.

Figure 14:
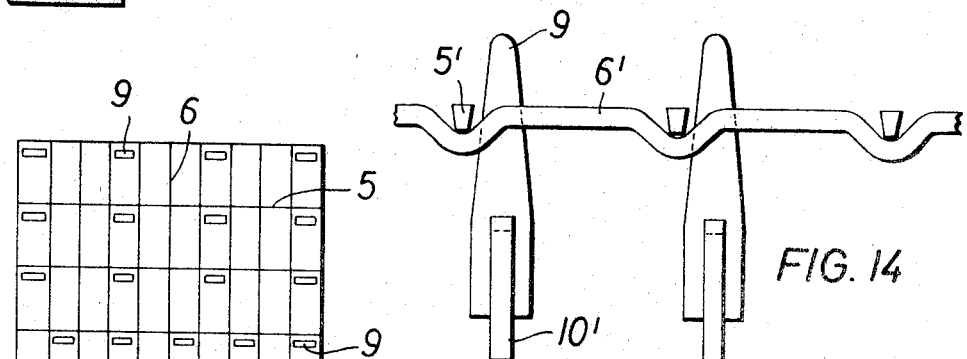

In FIG. 1 the screen proper has a wavy surface, in that both the crossbars 5 and the longitudinal wires 6 are of wavy or kinked shape. FIG. 14 is a side view corresponding to FIG. 13, and shows the kinks in the longitudinal wires 6'. In this case the comb teeth 9 are leaf-shaped and are mounted on the comb beam 10' and secured by brazing, welding or cementing, although the entire comb assembly can if desired be made in one piece, for example from plastics material.

Figure 15:
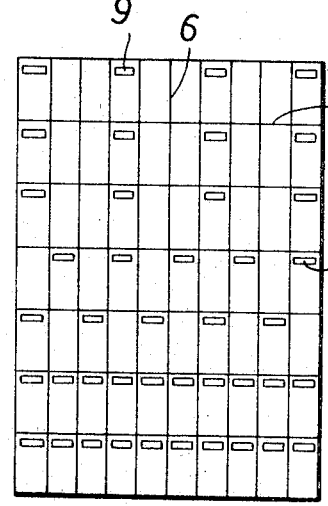

FIG. 15 is a plan view of a floor screen according to the invention, in which the comb teeth 9 are distributed at different spacings. This arrangement is of particular advantage in dry screening, in that the different particle sizes in the material, ranging from coarse to fine grain, can be screened and loosened in different ways. Any other distribution of the comb teeth 9 can of course be used if desired.

Figure 16:
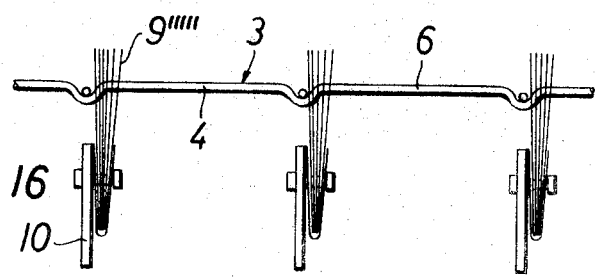

FIG. 16 shows a version particularly suitable for screening fine materials. In this case the comb teeth are in the form of bristles 9ᵛ assembled together to form flat brushes, which are attached to the comb beams. The bristles can penetrate individually or in groups through the fine slots 4 of the screen 3.

Figure 17:
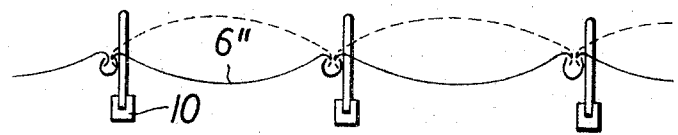

FIG. 17 shows that the floor screen need not necessarily be rigid, but can for example take the form of flexible woven sheets 6″ or the like. The comb teeth 9 penetrate through the woven material, which can if desired be moved vertically by the comb beams 10.

Figure 18:
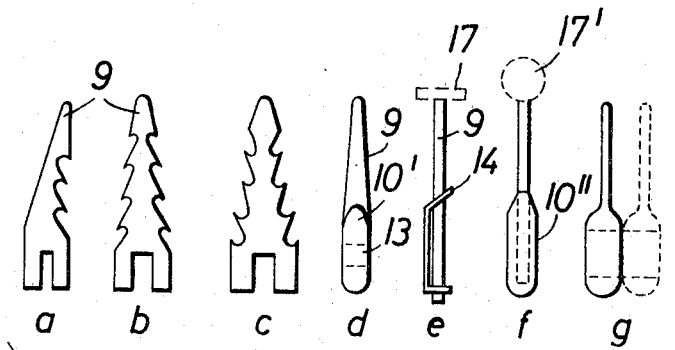

FIG. 18, a to g, shows further versions of comb teeth 9 and comb beams 10. The version shown in FIG. 18a shows a wide comb tooth 9 suitable for cooperation with a narrow slot 4 and having on one side saw teeth for removing a hard, caked material from the crossbars 5. FIGS. 18b and 18c show comb teeth which have saw edges on both sides. In FIG. 18b the teeth are directed downwards, and in FIG. 18c they are directed upwards. FIG. 18d shows a normal saw tooth, made of plastics material and having an attachment hole 13 passing through a tooth foot 10. Comb teeth of this kind are threaded close together on a suitable beam, for example on a longitudinal beam 7. The comb tooth shown in FIG. 18e consists of a shaft inserted into a U-shaped beam 14, and secured by welding or cementing. A comb tooth of this kind can for example be made of spring steel. The comb tooth shown in FIG. 18f has a beam section 10″, and the comb teeth 9 are inserted into vertical drillings in the beam 10″, and secured by being forced in and cemented or by welding. FIG. 18g shows plastic comb teeth suitable for particularly narrow slots. These comb teeth are threaded like pearls on a supporting beam.

FIG. 19 shows the floor screen mounted at an inclination in a wet preparation vessel. With this arrangement, settled solids can easily be removed and conveyed away from a body of pulp. This application of the floor screen occurs for example in the manufacture of pumice, and in the preparation of ores and coal.

FIG. 20 shows once more how the floor screen can be constructed by accurately positioning welding beads, either on the crossbar 5 or on the longitudinal wire 6. This method allows the floor screen to be constructed with the necessary precision. FIG. 21 shows how the lower edges of the screen structure, in particular the lower edge of the longitudinal wire 6, can have saw teeth, so that the space between the saw tooth 9 and the comb beam 10 can be more effectively cleaned. In this case the longitudinal wires 6 have pressed-out welding beads 15, whereas the crossbars 5 have smooth surfaces.

FIG. 22 shows a formation of slots in a screen plate 3. In this case each slot 4 has round ends 16 through which for example the spheres 17′ or plates 17 of the comb teeth shown in FIGS. 18f and 18e can penetrate, taking material with them through the screen plate.

FIG. 23 shows several comb teeth rows mounted together on a common comb beam 10.

Figure 24:
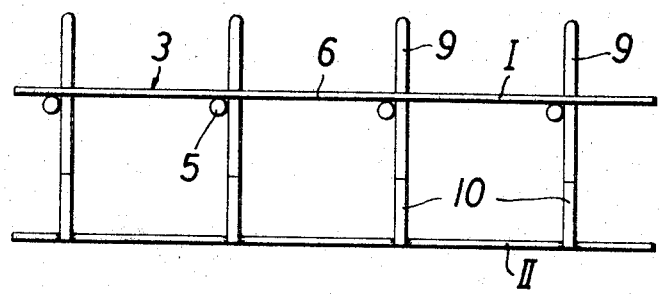
Figure 25:
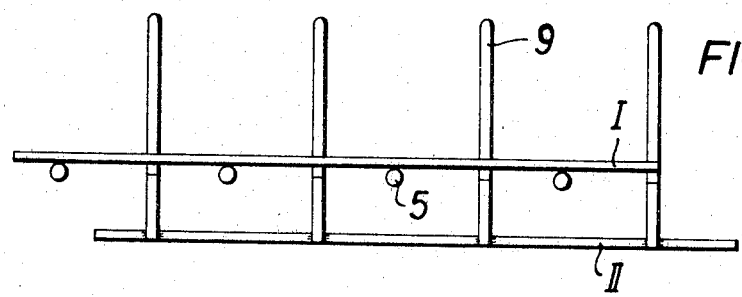
Figure 26:
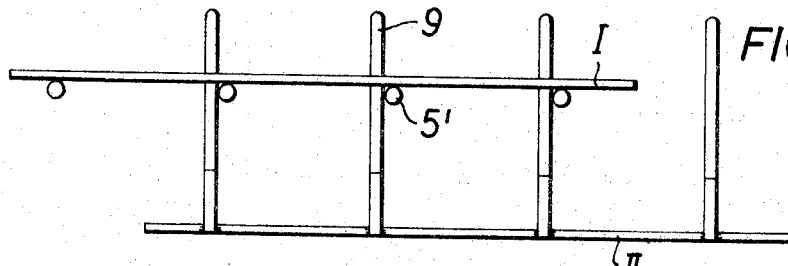
Figure 27:
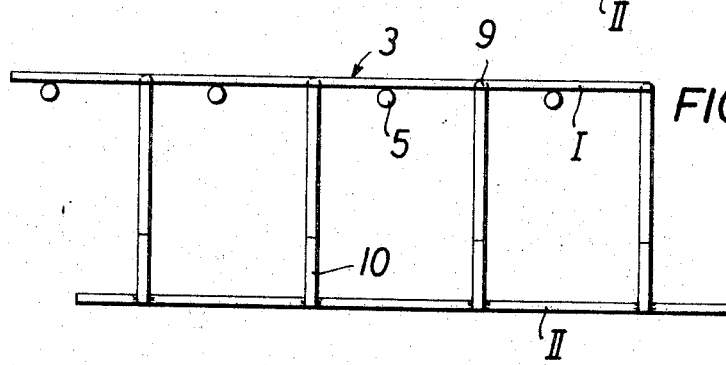
Figure 28:
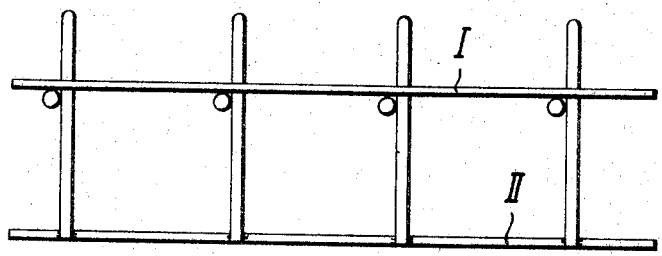

FIGS. 24 to 28 illustrate the cycle of movement performed by the two oscillating parts of the floor screen, that is to say the screen proper 3 consisting of crossbars 5 and longitudinal wires 6, and the lower frame consisting of the comb beams 10 and their comb teeth 9. At the right in each figure the relative positions of the two driving members I and II are indicated diagrammatically by small circles on a larger circle. FIG. 24 shows the initial positions of the two oscillating systems, the two driving members being in the same horizontal plane. The comb teeth 9 are in contact with the crossbars 5 of the screen surface. In FIG. 25 the two driving members have rotated through 90°, the comb teeth 9 have moved upwards to top dead centre, and the screen 3 has moved down to bottom dead centre. The comb teeth 9 have moved away from the crossbars 5. In FIG. 26, after further rotation of the driving members through 90°, the comb teeth 9 have descended half-way down and are now again at the same height as they were initially. However, now the comb teeth 9 are in contact with the next crossbars 5, against which they move downwards with a brushing movement. In FIG. 27, after a further 90° rotation of the driving supports, the comb beams 10 have reached bottom dead centre, whereas the screen proper 3 has reached top dead centre, and the tips of the comb teeth 9 have come just below the material being screened. Finally, in FIG. 28, after a further 90° rotation of the driving members, the two oscillating systems have returned to their initial positions, as represented in FIG. 24.

It is obvious that by suitably modifying the driving system the oscillating movements can be other than circular, for example oval or even approximately rectangular, in the planes followed by the screen slots 4 and the comb teeth 9 which penetrate into the slots.

The comb beams 10 and their teeth 9 can be made of any suitable flexible or inflexible material, for example plastics, leather, cast metal, steel, ceramic materials, glass or the like. Furthermore the comb beams 10 can be attached to the longitudinal beams by cementing, brazing, welding, screwing, riveting, clamping, forcing or the like. The comb beams 10 and the teeth 9 can if desired be hollow and a gaseous or fluid medium can flow through them, and can be fed to the screen proper 3, as may be necessary in particular screening processes. Furthermore, by suitably designing the comb teeth 9, electrical or mechanical effects can be produced in the plane of the screen.

I claim:

1. A self-cleaning sieve bottom for screening machines that separate and transport screening materials, comprising a first frame, a second frame therebeneath, a screen supported on said first frame and having a plurality of transverse and of longitudinal members defining elongated slots, a plurality of cleaning fingers mounted on said second frame, said cleaning fingers being spaced apart at the spacing of said slots and projecting upwards towards said slots, said first and second frames being adapted to oscillate relatively to one another with substantially circular movements about a common axis in upright planes parallel to said longitudinal members, separate driving means for the respective oscillating frames, said second frame comprising a plurality of transverse beams superposed by a plurality of longitudinal beams, and a plurality of comb beams mounted on said longitudinal beams and extending across and beneath said screen slots, said cleaning fingers being upwardly projecting comb teeth formed on said comb beams and oscillating therewith relative to said transverse members so as to brush past said transverse members and project through said slots during at least part of each cycle of relative oscillation of said first and second frames.

2. A sieve bottom according to claim 1, wherein the comb teeth have substantially rounded upper ends, and the slots are formed by crossbars and longitudinal wires having substantially trapezoidal cross-sections becoming narrower toward the bottom.

3. A sieve bottom according to claim 1, wherein the comb teeth have substantially pointed upper ends, and the slots are formed by crossbars and longitudinal wires having substantially trapezoidal cross sections becoming narrower toward the bottom.

4. A sieve bottom according to claim 1, wherein the comb teeth are of different lengths.

5. A sieve bottom according to claim 1, wherein a respective row of the comb teeth is disposed in a common plane and said comb teeth have upper parts which extend transversely to the vertical within the plane containing the comb teeth.

6. A sieve bottom according to claim 5, wherein the upper parts of the comb teeth projecting above said screen have saw-tooth front and rear edges which cooperate with the screen for producing a cutting action on the material being screened.

7. A sieve bottom according to claim 1, wherein said comb beams and said comb teeth thereof are together comprised of combs that are made of plastic material.

8. A sieve bottom according to claim 1, wherein said comb beams have U-shaped cross-sections and slots, said comb teeth being made of spring steel, and being received and secured in said slots.

9. A sieve bottom according to claim 1, wherein said comb teeth have enlarged heads in the form of discs or spheres which penetrate through correspondingly enlarged openings at the ends of the slot.

10. A sieve bottom according to claim 1, wherein said comb teeth consist of loops of wire through which there are inserted, above the screen, traverse bars resting loosely on the longitudinal wires of the screen.

11. A sieve bottom according to claim 1, wherein said comb teeth consist of the bristles of at least one flat brush attached to said comb beams.

12. A sieve bottom according to claim 1, wherein several rows of comb teeth together form a fork mounted on a common comb beam.

13. A sieve bottom according to claim 1, wherein said two oscillating frames which support said screen on the one hand, and said comb beams on the other hand, are joined together by flexible joints.

14. A sieve bottom according to claim 1, wherein said comb teeth have varied spacing from one another and are staggered in position so as to be received in only some of the screen slots.

15. A sieve bottom according to claim 1, wherein said screen is flexible and is arranged for movement vertically by said comb beams.

References Cited
UNITED STATES PATENTS

| | | | |
|---|---|---|---|
| 2,577,294 | 12/1951 | Aben | 15—37 |
| 2,647,271 | 8/1953 | Ryzenga | 15—37 |
| 2,649,599 | 8/1953 | Leadingham | 15—37 |
| 3,029,452 | 4/1962 | Scott | 15—37 |
| 3,077,624 | 2/1963 | Gerard | 15—37 |
| 3,115,653 | 12/1963 | Fresh et al. | 15—37 |
| 3,233,266 | 2/1966 | Darby | 15—37 |
| 265,087 | 9/1882 | Hurst | 209—385 |
| 348,128 | 8/1886 | Keeney | 209—384 X |
| 784,584 | 3/1905 | Myers | 209—387 |
| 3,254,767 | 6/1966 | Wehner | 209—379 X |
| 3,261,469 | 7/1966 | Wehner | 209—396 X |
| 3,379,309 | 4/1968 | Wehner | 209—415 |

HARRY B. THORNTON, Primary Examiner

R. HALPER, Assistant Examiner

U.S. Cl. X.R.

209—327, 396